United States Patent
Imamura et al.

(10) Patent No.: US 6,553,155 B1
(45) Date of Patent: Apr. 22, 2003

(54) IMAGE SENSOR AND OPTICAL CHARACTER READER

(75) Inventors: Masaya Imamura, Kyoto (JP); Hiromi Ogata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 08/227,992

(22) Filed: Apr. 15, 1994

Related U.S. Application Data

(63) Continuation of application No. 07/948,431, filed on Sep. 22, 1992, now abandoned.

(30) Foreign Application Priority Data

Sep. 30, 1991 (JP) .............................................. 3-250092
Jun. 8, 1992 (JP) .............................................. 4-146091

(51) Int. Cl.[7] ................................................ G06K 7/10
(52) U.S. Cl. ...................................... 382/321; 358/474
(58) Field of Search ............................... 382/58, 65–67, 382/321, 322, 323; 354/160, 161; 355/18, 55, 231, 234; 358/483, 474, 496, 497; 250/208.1

(56) References Cited

U.S. PATENT DOCUMENTS

| | | | | |
|---|---|---|---|---|
| 434,807 A | * | 8/1890 | Rhodes ....................... 354/161 |
| 3,825,938 A | * | 7/1974 | Koch ......................... 354/160 |
| 4,710,913 A | * | 12/1987 | Matsushima et al. ....... 369/280 |
| 5,027,424 A | * | 6/1991 | Yamazaki et al. ............ 382/58 |
| 5,136,433 A | * | 8/1992 | Durell ........................ 359/829 |

* cited by examiner

*Primary Examiner*—Jon Chang
(74) *Attorney, Agent, or Firm*—Birch, Stewart, Kolasch & Birch, LLP

(57) ABSTRACT

An image sensor can easily adjust the focus by the use of an inexpensive focus adjusting means even if the dimensional accuracy in the image sensor frame is very low. In the image sensor or an optical character reader incorporating such an image sensor, an original document W, which is being conveyed onto a transparent covering by a platen roller, is irradiated by light from a light emitting element. The light reflected by the original document W is received and condensed by a rod lens array which is positioned perpendicular to the surface of the transparent covering. The condensed light is received by a light receiving element which is located directly below the rod lens array. At the light receiving element, the light is converted into an electrical signal. The image sensor includes a frame having an opened top which includes inner tapered sidewalls opposed to each other. When a transparent covering having the conventional configuration is to be mounted in the opened top of the frame, the focal length H can be easily adjusted by changing the inclination of the transparent covering relative to the opened top of the frame.

16 Claims, 6 Drawing Sheets

IMAGE SENSOR AND OPTICAL CHARACTER READER

This application is a continuation of application Ser. No. 07/948,431 filed on Sep. 22, 1992, now abandoned.

BACKGROUND OF THE INVENTION

1. Field of the Invention

The present invention relates to an image sensor and an optical character reader and particularly to an improved image sensor usable in optical character readers.

2. Description of the Related Art

An image sensor comprises an array of light emitting elements such as LED's or the like, from which light is irradiated on an original document within a given range of lines. The light reflected by the original document is then condensed by a condensing lens, the condensed light being received by an array of light receiving elements wherein the light is converted into an electrical signal including image information for the original document. Such a reading cycle for each line is repeated to read the overall information of the original document image. Such an image sensor is known as a "line image sensor" and is frequently used in the image reading section of an optical character reader such as a facsimile machine.

FIG. 5 shows an image sensor 130 which is generally used in the optical character reader. The image sensor 130 comprises a frame 110, the top of which supports a transparent covering (glass covering) 111. Within the interior of the frame 110, there are disposed a light emitting element 112 for irradiating light onto an original document W placed on the transparent covering 111; a base plate 113 on which the light emitting element 112 is mounted; a rod lens array 114 which is normally used as an optical system for condensing the light reflected by the original document W; a light receiving element 115 for receiving the light from the rod lens array 114; and another base plate 116 on which the light receiving element 115 is mounted.

In such an image sensor 130 of the related art, the original document W, which is being moved by a platen roller 120, is irradiated by the light from the light emitting element 112 at the same time as the original document W is brought into contact with the transparent covering 111. The angle of irradiation between the transparent covering 111 and the light beam from the light emitting element 112 is equal to about 45 degrees. The light reflected from the original document W is therefore received and condensed by the rod lens array 114 which is located at a position perpendicular to the surface of the transparent covering 111. After passing through the rod lens array 114, the light is received by the light receiving element 115 which is positioned directly below the rod lens array 114 and which converts the light into the electrical signal.

If an optical path from the original document W to the light receiving element 115, that is, a focal length H from the top of the transparent covering 111 to the light receiving element 115 is not correct, the reflected light will be out of focus, resulting in improper detection of the light information of the original document W at the light receiving element 115.

In the aforementioned image sensor, however, the transparent covering 111, rod lens array 114 and light receiving element 115 are fixedly mounted in the optical path within the exterior of the frame 110. This raises a problem in that the focal length H may be varied depending on the dimensional accuracy in the frame 110. Particularly, if the dimensional accuracy of the frame 110 is very low, the focal length H will be greatly varied. This will undoubtedly lead to the light being out of focus.

In order to overcome such a problem, an image sensor has been proposed which can regulate the focus by controllably moving the rod lens array 114 in the vertical direction. In the proposed image sensor, the rod lens array 114 is mounted on the frame 110 by screw means. When the screw means is suitably tightened or untightened, the position of the rod lens array 114 can be adjusted.

However, such an adjustment is troublesome. Furthermore, threaded apertures for receiving the screws must be formed in both the frame and rod lens array 110, 114. This results in increase of the manufacturing cost.

SUMMARY OF THE INVENTION

It is therefore an object of the present invention to provide an image sensor which can be have its focus easily adjusted even if the dimensional accuracy in the frame is low and which comprises an inexpensive focus adjusting means for attaining the aforementioned adjustment.

Another object of the present invention is to provide an optical character reader which uses the abovementioned image sensor.

To this end, the present invention provides an image sensor comprising a frame having an opened top; a transparent covering mounted over the opened top of the frame and adapted to receive an original document to be read; a platen roller for moving the original document onto the transparent covering; a light emitting section for irradiating light onto the original document; an optical system for condensing the light reflected by the original document; and a light receiving section for receiving the condensed light through the optical system, the opened top of the frame having inner tapered sidewalls opposed to each other, whereby the focal length from the transparent covering to the light receiving section can be adjusted by mounting the transparent covering in the opened top of the frame while adjusting the angle of the transparent covering relative to the inner tapered sidewalls of the frame.

The present invention also provides an image sensor comprising a frame having an opened top; a transparent covering mounted over the opened top of the frame and adapted to receive an original document to be read; a platen roller for moving the original document onto the transparent covering; a light emitting section for irradiating light onto the original document; an optical system for condensing the light reflected by the original document; and a light receiving section for receiving the condensed light through the optical system, the opened top of the frame having inner tapered sidewalls opposed to each other, the transparent covering including top and bottom chamfered edges having different angles, whereby the focal length from the transparent covering to the light receiving section can be adjusted by selecting and using either of the top or bottom chamfered edge when the transparent covering is to be mounted in the opened top of the frame.

The present invention further provides an optical character reader comprising an original document supply section including a feed-in tray for retaining a stack of original documents to be read, a feed roller for picking up and conveying the uppermost original document from the stack and an image sensor for reading characters on the original document conveyed by the feed roller as image signals; a recording sheet supply section including a platen roller for conveying a recording sheet to which the characters on the original document are to be transferred; and a thermal transfer printing section for printing the image read by the image sensor on the recording sheet, the image sensor comprising a frame having an opened top; a transparent covering mounted over the opened top of the frame and adapted to receive an original document to be read; a platen roller for moving the original document onto the transparent covering; a light emitting section for irradiating light onto the original document; an optical system for condensing the light reflected by the original document; and a light receiving section for receiving the condensed light through the optical system, the opened top of the frame having inner tapered sidewalls opposed to each other, whereby the focal length from the transparent covering to the light receiving section can be adjusted by mounting the transparent covering in the opened top of the frame while adjusting the angle of the transparent covering relative to the inner tapered sidewalls of the frame.

The present invention further provides an optical character reader comprising an original document supply section including a feed-in tray for retaining a stack of original documents to be read, a feed roller for picking up and conveying the uppermost original document from the stack and an image sensor for reading characters on the original document conveyed by the feed roller as image signals; a recording sheet supply section including a platen roller for conveying a recording sheet to which the characters on the original document are to be transferred; and a thermal transfer printing section for printing the image read by the image sensor on the recording sheet, the image sensor comprising a frame having an opened top; a transparent covering mounted over the opened top of the frame and adapted to receive an original document to be read; a platen roller for moving the original document onto the transparent covering; a light emitting section for irradiating light onto the original document; an optical system for condensing the light reflected by the original document; and a light receiving section for receiving the condensed light through the optical system, the opened top of the frame having inner tapered sidewalls opposed to each other, the transparent covering including top and bottom chamfered edges having different angles, whereby the focal length from the transparent covering to the light receiving section can be adjusted by selecting and using either of the top or bottom chamfered edge when the transparent covering is to be mounted in the opened top of the frame.

In the image sensor and optical character reader of the present invention, the inner tapered sidewalls of the opened top of the image sensor frame enable the transparent covering to be mounted in the opened top of the frame while adjusting the angle of the transparent covering relative to the inner tapered sidewalls of the frame. Therefore, if the dimensional accuracy of the image sensor frame is very low, the focal length from the top face of the transparent covering to the light receiving section can be easily adjusted.

Since the opened top of the image sensor frame has the inner tapered sidewalls and also the transparent covering includes top and bottom chamfered edges having different angles, the focal length from the transparent covering to the light receiving section can be easily adjusted by selecting and using either of the top or bottom chamfered edge when the transparent covering is to be mounted in the opened top of the frame.

DETAILED DESCRIPTION OF THE PREFERRED EMBODIMENTS

Figure 1:
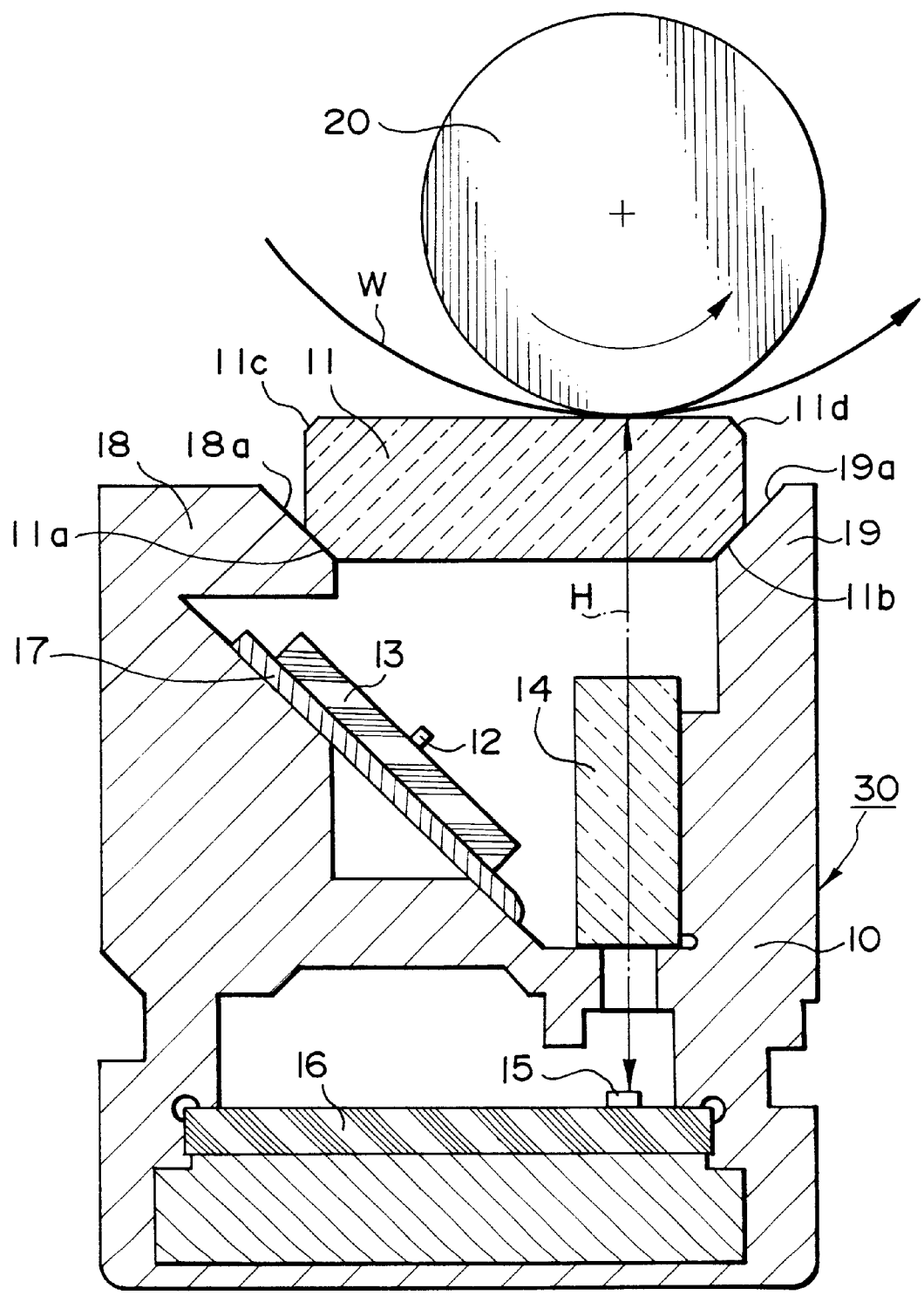
FIG. 1 is a cross-sectional view of one embodiment of an image sensor constructed in accordance with the present invention.

Referring now to FIG. 1, there is shown an image sensor 30 constructed in accordance with the present invention. The image sensor 30 comprises a frame 10 having an opened top in which a transparent covering (glass covering) 11 is mounted. Within the interior of the frame 10, there are disposed a light emitting element 12 for irradiating light onto an original document W to be read which is in contact with the transparent covering 11; a base plate 13 on which the light emitting element 12 is mounted; a rod lens array 14 which is normally used as an optical system for condensing the light reflected by the original document W; a light receiving element 15 for receiving the condensed light from the rod lens array 14; and another base plate 16 on which the light receiving element 15 is mounted.

The base plate 13 is mounted on a support piece 17 which is fixedly mounted in the frame 10 and positioned with an angle (e.g. 45 degrees) relative to the transparent covering 11. The rod lens array 14 is fixedly mounted in the frame 10 such that the rod lens array 14 extends perpendicular to the transparent covering 11 and base plate, 16.

The original document W, which has been moved in by a platen roller 20, is irradiated by the light from the light emitting element 12 at the same time as the original document W is brought into contact with the transparent covering 11. Since the angle of irradiation between the transparent covering 11 and the light emitting element 12 is set to be equal to about 45 degrees as described, the light reflected by the original document W is received and condensed by the rod lens array 14 which is positioned perpendicular to the transparent covering 11. The condensed light is then received by the light receiving element 15 which is located directly below the rod lens array 14. At the light receiving element 15, the light is converted into an electrical signal.

As described hereinbefore, the optical path from the original document W to the light receiving element 15 will be called a focal length H from the top of the transparent covering 11 to the light receiving element 15.

The first embodiment of the present invention is characterized by the fact that the inner opposed sidewalls 18 and 19 of the opened top of the frame 10 are tapered to form slopes 18a and 19a therein.

Figure 3:
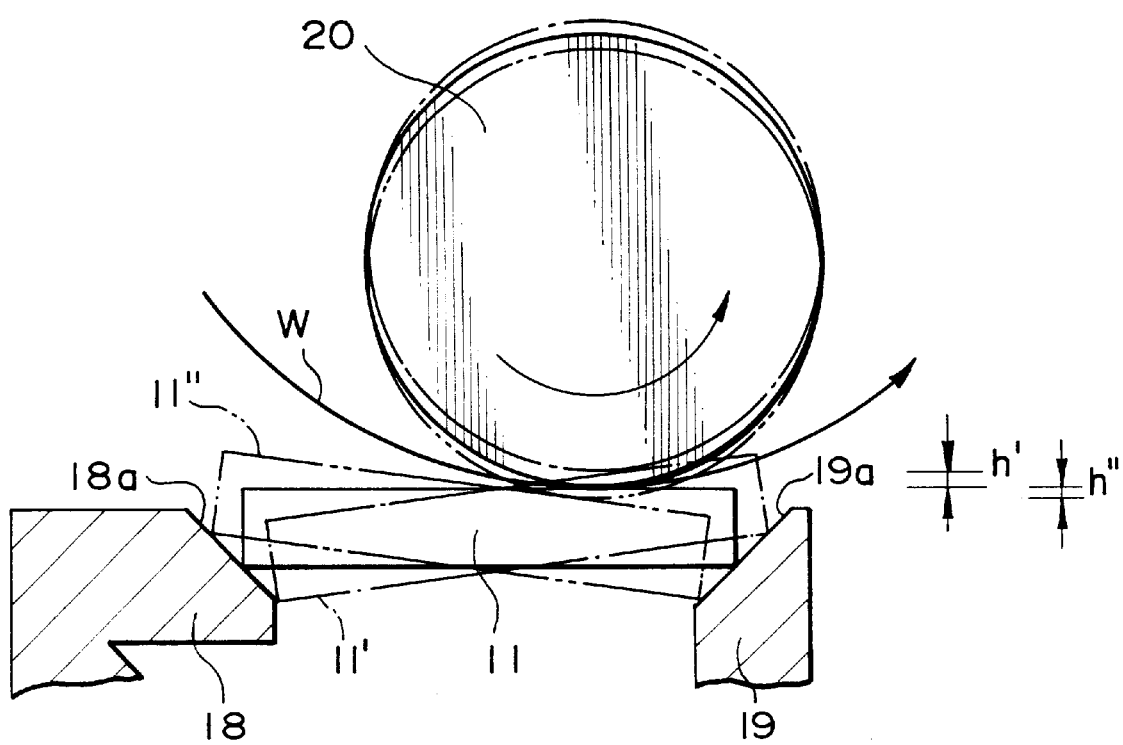
FIG. 3 is a cross-sectional view of the primary parts of another focus adjusting means usable in the image sensor of FIG. 1.

If the transparent covering 11 having such a conventional configuration as shown in FIG. 3 is used to be supported on the tapered sidewalls 18, 19 of the opened frame top, the focal length H can be adjusted simply by changing the angle of the transparent covering 11.

More particularly, when the transparent covering 11 is located at a position shown by 11', the focal length H becomes a value represented by (H+h'). If the transparent covering 11 is located at a position shown by 11", the focal length H becomes a value represented by (H–h"). In such a manner, the focal length H can be easily adjusted in accordance with the present invention.

Figure 6:
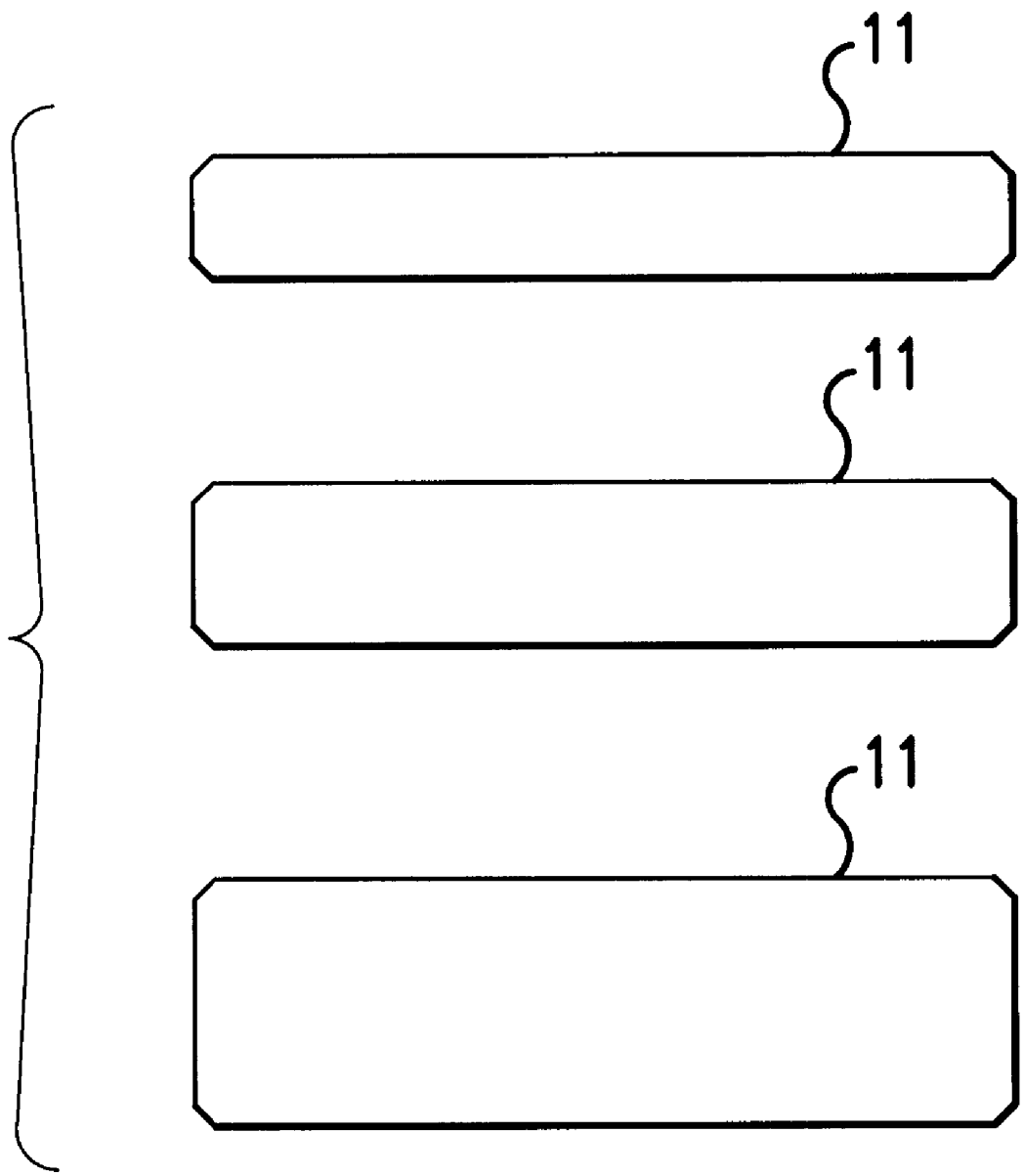
FIG. 6 is an illustration of transparent coverings of differing thicknesses.

If a plurality of transparent coverings being different from one another in thickness are provided, as illustrated in FIG. 6 any one of these transparent coverings may be selected to perform the fine adjustment for the focal length.

Figure 2:
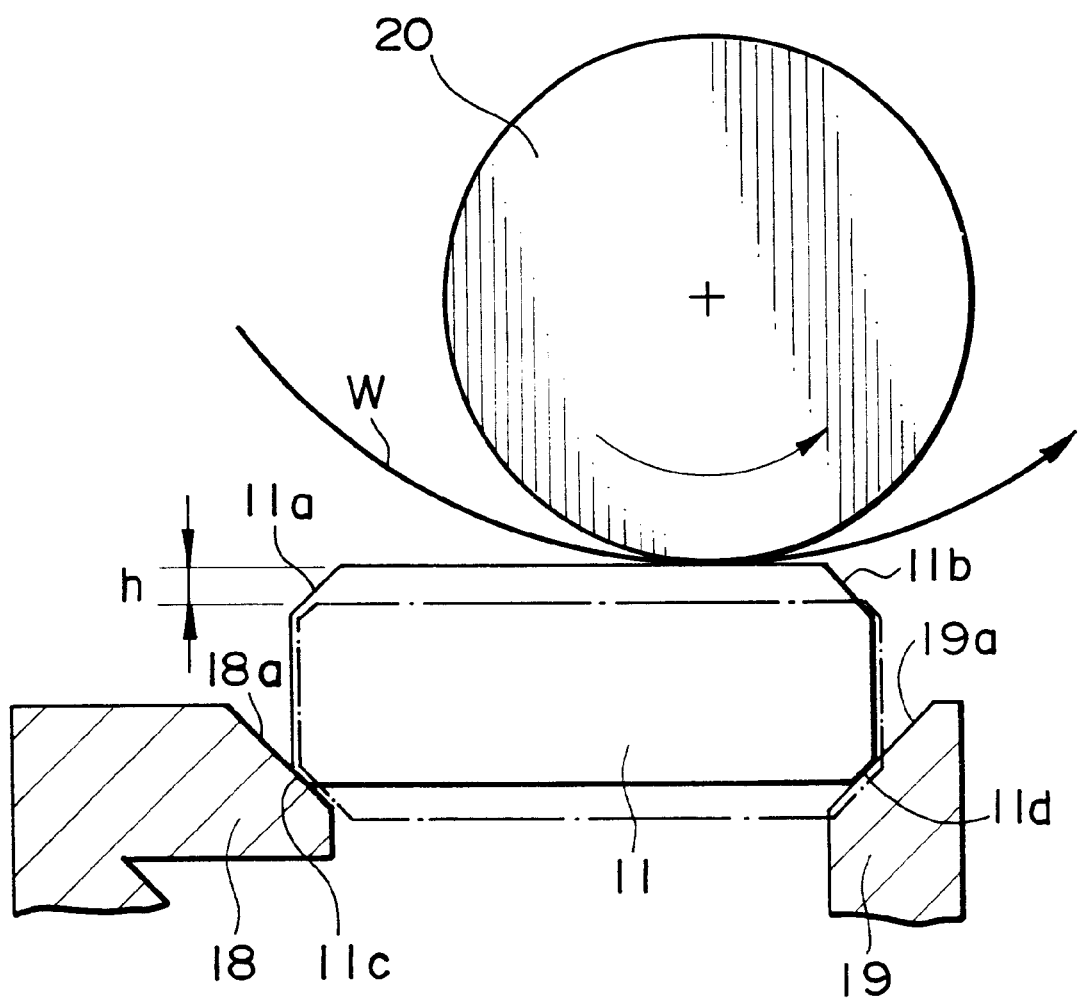
FIG. 2 is a cross-sectional view of the primary parts of a focus adjusting means usable in the image sensor of FIG. 1.

The second embodiment of the present invention is characterized by that in addition to the provision of slopes 18a, 19a of the inner tapered sidewalls 18, 19 in the opened frame top, as shown in FIG. 2 the top and bottom edges of the transparent covering are chamfered with different depths. More particularly, two chamfers 11c, 11d are formed on the top of the transparent covering at its edges while two chamfers 11a, 11b are formed on the bottom of the transparent covering at its edges. These chamfers are adapted to engage the respective slopes 18a, 19a of the opened top sidewalls 18, 19 in the frame when the transparent covering is mounted in the opened top of the frame.

When the transparent covering 11 is mounted in the opened top of the frame, the focal length H can be easily adjusted by selecting either of the top or bottom of the transparent covering 11 to be engaged by the inner tapered sidewalls 18, 19 of the frame top.

If the chamfers in the bottom of the transparent covering have a depth larger than that of the chamfers of the top and when the transparent covering is mounted in the opened frame top with the bottom chamfers being engaged by the inner tapered sidewalls of the frame, the focal length H becomes a value represented by (H+h).

By providing a plurality of transparent coverings having various top and bottom chamfers, any one of these transparent coverings may be selected to perform the fine adjustment for focal length.

Any one of the aforementioned image sensors according to the present invention may be operatively mounted in an optical character reader.

Figure 4:
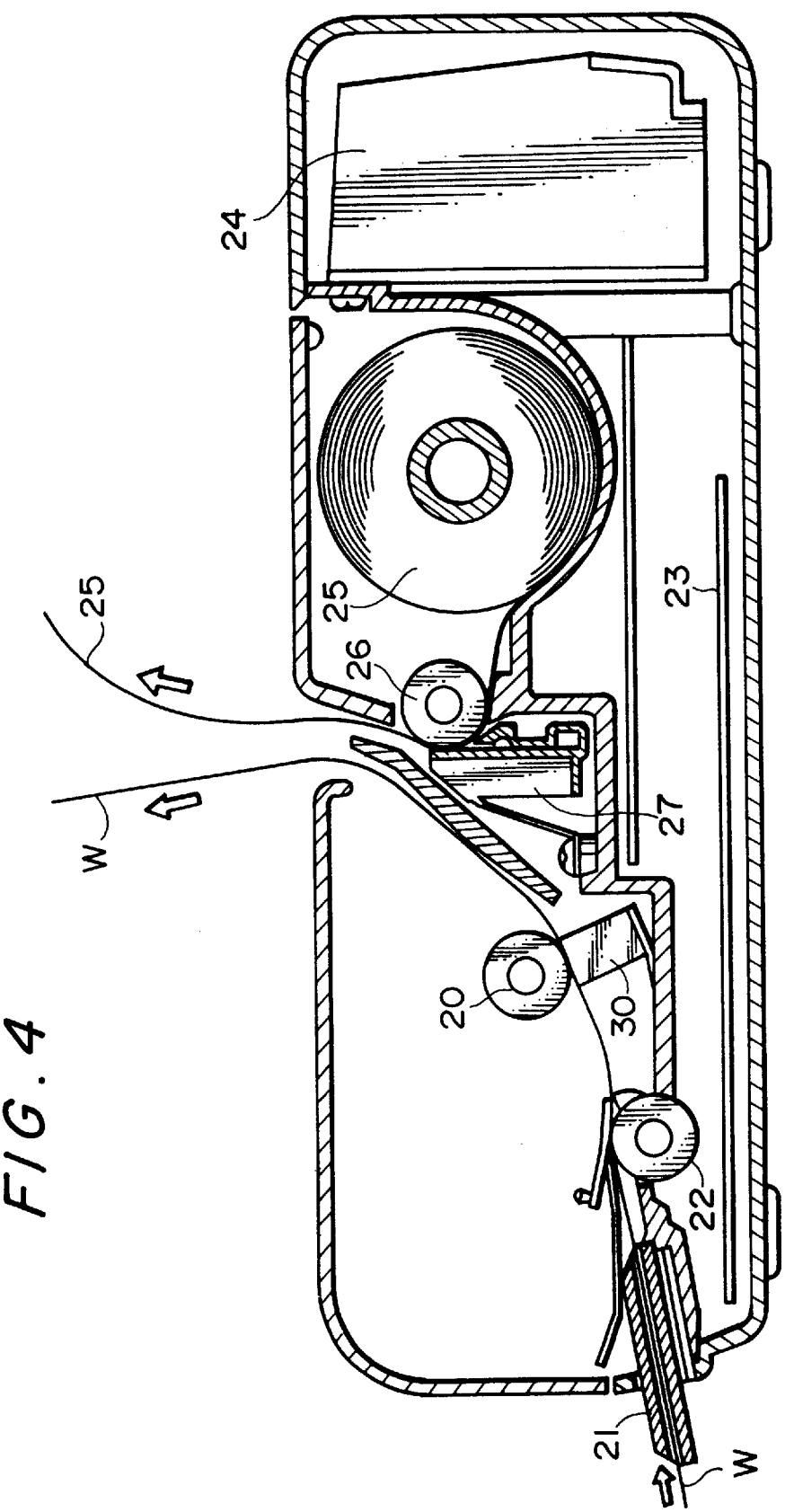
FIG. 4 is a cross-sectional view of one embodiment of an optical character reader constructed in accordance with the present invention.
Figure 5:
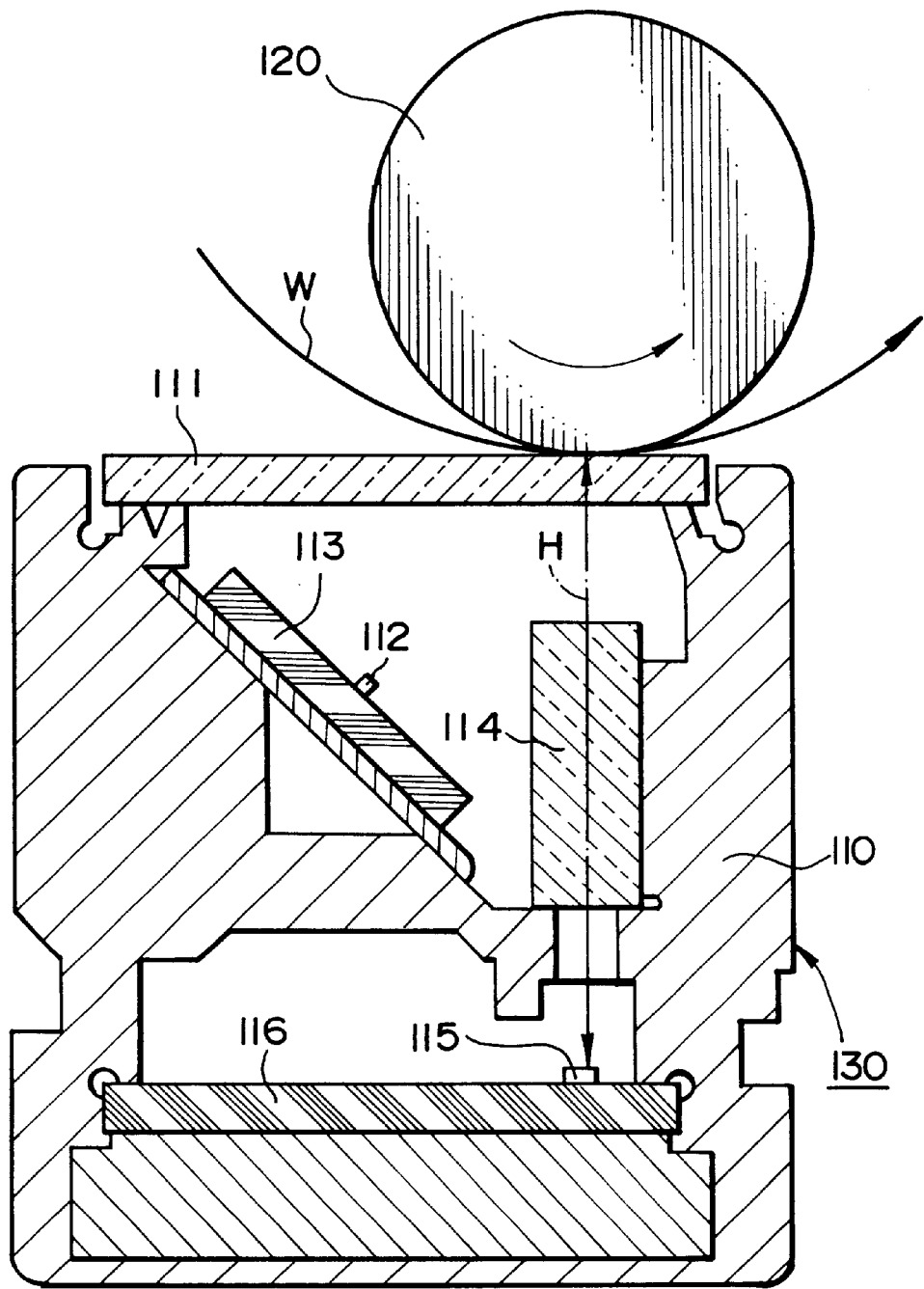
FIG. 5 is a cross-sectional view of an image sensor constructed in accordance with the prior art.

FIG. 4 shows such an optical character reader which comprises an original document supply section, a recording sheet supply section, a thermal transfer printing section, a system control plate 23 and a source of power 24.

The original document supply section comprises a feed-in tray 21 retaining a stack of original documents W, a feed-in roller 22 for picking up and conveying the uppermost sheet from the stack, and an image sensor 30 constructed in accordance with the present invention. The recording sheet supply section comprises a platen roller 26 for conveying a recording sheet 25.

In the optical character reader of the present invention, the image on the original document W is read by the image sensor 30, with the image information thereof being transferred to the recording sheet by the thermal transfer printing section, for example, by a thermal head 27.

As will be apparent from the foregoing, the image sensor and optical character reader of the present invention comprise the inner tapered sidewalls of the opened top of the image sensor frame which enable the transparent covering to be mounted in the opened top of the frame while adjusting the angle of the transparent covering relative to the inner tapered sidewalls of the frame. Therefore, if the dimensional accuracy of the image sensor frame is very low, the focal length from the top face of the transparent covering to the light receiving section can be easily adjusted.

Since the opened top of the image sensor frame has the inner tapered sidewalls and also the transparent covering includes top and bottom chamfered edges having different angles, the focal length from the transparent covering to the light receiving section can be easily adjusted by selecting and using either of the top or bottom chamfered edge when the transparent covering is to be mounted in the opened top of the frame.

If a plurality of transparent coverings different from one another in thickness are provided as illustrated in FIG. 6, any one of these transparent coverings may be selected depending on the desired focal length when the selected transparent covering is mounted in the opened top of the frame. This further facilitates to perform the fine adjustment for focal length.

If the chamfers in the bottom of the transparent covering have an angle larger than that of the chamfers of the top and when the transparent covering is mounted in the opened frame top with the bottom chamfers being engaged by the inner tapered sidewalls of the frame, the focal length may be simply increased.

What is claimed is:

1. An image sensor comprising:
   a frame having an opened top, said opened top including inner tapered sidewalls opposed to each other;
   a first transparent covering mounted in the opened top of said frame with which an original document to be read is brought into contact, said first transparent covering being capable of being inclined at a desired angle to change the thickness of said first transparent covering above said opened top of said frame, along a light receiving axis of said image sensor, thereby changing the focal length from the top of said first transparent covering to a light receiving section;
   a platen roller for moving an original document to be read onto said first transparent covering;
   a light emitting section for irradiating light onto the original document;
   an optical system for condensing the light reflected by the original document; and
   the light receiving section for receiving the condensed light from said optical system.

2. An image sensor as defined in claim 1, further comprising a second transparent covering, having a different thickness from said first transparent covering, wherein when said first transparent covering is removed from said opened top of said frame and replaced with said second transparent covering, a focal length from a top of said second transparent covering to said light receiving section is different from the focal length from the top of said first transparent covering.

3. An image sensor comprising:
   a frame having an opened top, said opened top including opposing inner tapered sidewalls;
   a first transparent covering mounted in the opened top of said frame with which an original document is brought into contact, said transparent covering including chamfers at top and bottom edges thereof, said top and bottom chamfers having different depths to change the thickness of said first transparent covering above said opened top of said frame, along the light receiving axis of said image sensor, thereby changing a focal length from a top of said first transparent covering to a light receiver when said first transparent covering is mounted on the opposing inner tapered sidewalls of said frame;
   a platen roller for moving an original document onto said first transparent covering;

a light emitter for irradiating light onto the original document; and an optical system for condensing light reflected by the original document; said light receiver receiving the condensed light from said optical system.

4. The image sensor of claim 3 wherein the chamfer depth of the bottom edge of said first transparent covering is larger than the chamfer depth of the top edge of said first transparent covering such that the chamfer depth of the top edge of said first transparent covering increases a distance from the top of said first transparent covering to said light receiver.

5. The image sensor of claim 3, further comprising a second transparent covering having different top and bottom chamfer depths from said first transparent covering, wherein when said first transparent covering is removed from said opened top of said frame and replaced with said second transparent opening, a focal length from the top of said second transparent covering to said light receiver is different from the focal length from the top of said first transparent covering.

6. An image sensor, comprising:

a frame, including an opening, for housing said image sensor;

optical means for irradiating light on and receiving light reflected by a document;

focal length changing means, including a transparent covering, for changing a focal length formed by said frame, and said transparent covering, and said optical means by changing a thickness of said transparent covering above the top portion of said frame, along a light receiving axis of said image sensor.

7. The image sensor of claim 6, wherein the thickness of said transparent covering above the top portion of said frame, along the light receiving axis of said image sensor is changed by changing an inclination angle of said transparent covering on opposing inner tapered sidewalls on said top portion of said frame.

8. The image sensor of claim 6, wherein said transparent covering includes top and bottom chamfers, a depth of the top chamfer is different from a depth of the bottom chamfer, and the thickness of said transparent covering above the top portion of said frame, along the light receiving axis of said image sensor is changed by inverting said transparent covering.

9. The image sensor of claim 6, said focal length changing means including a plurality of transparent coverings, wherein the focal length is changed by replacing a first of said plurality of transparent coverings, positioned over said opening, having a first thickness above the top portion of said frame, along the light receiving axis of said image sensor with a second of said plurality of transparent covering having a second thickness above the top portion of said frame, along the light receiving axis of said image sensor, different from said first thickness.

10. An optical character reader comprising:

an image sensor including,
a frame having an opened top, said opened top including opposing inner tapered sidewalls;
a first transparent covering mounted in the opened top of said frame with which an original document is brought into contact, said transparent covering including chamfers at top and bottom edges thereof, said top and bottom chamfers having different depths to change the thickness of said transparent covering above the top portion of said frame, along the light receiving axis of said image sensor, thereby changing a focal length from a top of said first transparent covering to a light receiver when said first transparent covering is mounted on the opposing inner tapered sidewalls of said frame;
a platen roller for moving an original document onto said first transparent covering;
a light emitter for irradiating light onto the original document; and
an optical system for condensing light reflected by the original document; said light receiver receiving the condensed light from said optical system.

11. An image sensor according to claim 10, wherein the chamfer depth of the bottom edge of said first transparent covering is larger than the chamfer depth of the top edge of said first transparent covering such that the chamfer depth of the top edge of said first transparent covering increases a distance from the top of said first transparent covering.

12. An image sensor according to claim 10, further comprising a second transparent covering having different top and bottom chamfer depths from said first transparent covering, and wherein when said first transparent covering is removed from said opened top of said frame and replaced with said second transparent opening, a focal length from the top of said second transparent covering to said light receiver is different from a focal length from the top of said first transparent covering.

13. An optical character reader comprising:

an image sensor, including,
a frame, including an opening, for housing said image sensor;
optical means for irradiating light on and receiving light reflected by a document;
focal length changing means, including a transparent covering, for changing a focal length formed by said frame and said optical means by changing a thickness of said transparent covering above a top portion of said frame, alone a light receiving axis of said image sensor.

14. An image sensor according to claim 13, wherein the thickness of said transparent covering above the top portion of said frame, along a light receiving axis of said image sensor is changed by changing an inclination angle of said transparent covering on opposing inner tapered sidewalls on said top portion of said frame.

15. An image sensor according to claim 13, said transparent covering, including top and bottom chamfers, wherein a depth of the top chamfer is different from a depth of the bottom chamfer, and the thickness of said transparent covering above the top portion of said frame, along the light receiving axis of said image sensor is changed by inverting said transparent covering.

16. An image sensor according to claim 13, said focal length changing means including a plurality of transparent coverings, wherein the focal length is changed by replacing a first of said plurality of transparent coverings, positioned over said opening, having a first thickness above the top portion of said frame, along the light receiving axis of said image sensor with a second of said plurality of transparent covering, having a second thickness above the top portion of said frame, along the light receiving axis of said image sensor, different from said first thickness.

* * * * *